(12) United States Patent
Borcard

(10) Patent No.: US 12,172,853 B2
(45) Date of Patent: Dec. 24, 2024

(54) CAPSULE PROCESSING PLANT WITH PNEUMATIC GATE

(71) Applicant: Serac Group, La Ferte Bernard (FR)

(72) Inventor: Julien Borcard, Saint Georges du Rosay (FR)

(73) Assignee: SERAC GROUP, La Ferte Bernard (FR)

( * ) Notice: Subject to any disclaimer, the term of this patent is extended or adjusted under 35 U.S.C. 154(b) by 150 days.

(21) Appl. No.: 17/801,114

(22) PCT Filed: Feb. 22, 2021

(86) PCT No.: PCT/EP2021/054297
§ 371 (c)(1),
(2) Date: Aug. 19, 2022

(87) PCT Pub. No.: WO2021/165526
PCT Pub. Date: Aug. 26, 2021

(65) Prior Publication Data
US 2023/0082244 A1    Mar. 16, 2023

(30) Foreign Application Priority Data
Feb. 21, 2020   (FR) ...................... 2001772

(51) Int. Cl.
*B65G 51/03*   (2006.01)
*B65G 47/14*   (2006.01)

(52) U.S. Cl.
CPC ......... *B65G 51/03* (2013.01); *B65G 47/1492* (2013.01)

(58) Field of Classification Search
None
See application file for complete search history.

(56) References Cited

U.S. PATENT DOCUMENTS

| 2,781,947 | A | * | 2/1957 | Webster | ................. B65B 57/20 221/296 |
| 3,210,124 | A | | 10/1965 | Niemi et al. | |
| 4,573,830 | A | | 3/1986 | Richardson et al. | |
| 6,039,512 | A | * | 3/2000 | Chooi | ................. H05K 13/028 406/137 |
| 7,198,146 | B2 | * | 4/2007 | Guidetti | ................. B65B 23/12 198/418.7 |

(Continued)

*Primary Examiner* — William R Harp
(74) *Attorney, Agent, or Firm* — MUNCY, GEISSLER, OLDS & LOWE, P.C.

(57) ABSTRACT

A plant for processing packaging sealing elements having a peripheral edge includes a processing area and a device for transporting the packaging sealing elements. The device includes a slide having two opposite longitudinal rims slidingly receiving two opposite portions of the peripheral edge of each sealing element, and a means for moving the sealing elements along the slide. The device includes at least one transverse blowing nozzle mounted in a hole of one of the rims of the slide in order to eject a flow of air towards the opposite rim. The transverse nozzle is associated with a control element for selectively authorising or interrupting the air supply of the transverse blowing nozzle. The slide has a first section upstream of the processing area, a second section in the processing area, and a third section downstream of the processing area. The transverse blowing nozzle is mounted on the second section.

7 Claims, 3 Drawing Sheets

(56) References Cited

U.S. PATENT DOCUMENTS

| | | |
|---|---|---|
| 7,850,403 B2 | 12/2010 | Lorange et al. |
| 2007/0212174 A1 | 9/2007 | Hayashi et al. |
| 2007/0287119 A1 | 12/2007 | Lyons et al. |
| 2012/0273693 A1 | 11/2012 | Houde |

* cited by examiner

CAPSULE PROCESSING PLANT WITH PNEUMATIC GATE

The present invention relates to the field of packaging, and more particularly to closing containers.

BACKGROUND OF THE INVENTION

It is known to close containers by using closure elements such as capsules and caps.

Capsules (also referred to as "lids") generally comprise a piece of flexible metal foil having a face covered in a layer of meltable material A heat sealing installation generally includes a device for transporting capsules to the sealing station, where the capsules are put on the containers. The transport device usually includes a slideway for slidably receiving two opposite portions of the peripheral edge of each capsule, together with nozzles for blowing air in the longitudinal direction of the slideway in order to cause the capsules to move along the slideway.

It is sometimes necessary for the flow of capsules in a zone of the slideway to be interrupted temporarily, e.g. in order to apply a sterilization or decontamination operation to one or more capsules. A mechanical gate is generally used for this purpose, which gate is moved between a position in which it projects into the slideway and a position in which it is retracted out from the slideway. Nevertheless, that solution presents the drawback that the gate and the capsule come into contact with each other, running the risk of damaging the edge of the capsule, with this applying more particularly if the capsule is travelling at high speed. Also, if the capsules are close to one another, it is necessary to ensure enough space between two capsules in order to leave time for the gate to take up its projecting position without running the risk of striking one of the capsules.

Caps are made out of polymer or out of metal. A cap has the shape of an open cylinder with a base (also referred to as a cover) and an annular wall or peripheral edge (also referred to as a rim). Drawbacks analogous to those mentioned above can likewise affect the supply of caps when they are fed by means of a slideway.

OBJECT OF THE INVENTION

A particular object of the invention is to provide means for stopping at least one closure element travelling along a slideway.

SUMMARY OF THE INVENTION

To this end, according invention, there is provided a transport device for transporting packaging closure elements each having a peripheral edge, the device comprising both a slideway having two opposite longitudinal flanges receiving in slidable manner two opposite portions of the peripheral edge of each closure element, and also movement means for moving the closure elements along the slideway. The device includes at least one transverse blow nozzle mounted in a hole in one of the flanges of the slideway in order to eject a flow of air towards the opposite flange, the transverse nozzle being associated with a control element for selectively allowing or interrupting air feed to the transverse blow nozzle.

Thus, it is a transverse flow of air that causes the closure element to stop, thereby limiting or even eliminating impacts and thus reducing any risk of the closure elements being damaged, and more particularly any risk of their peripheral edges being deformed.

Advantageously, the installation includes at least one suction nozzle opening out in the slideway in order to hold a portion of a facing closure element, the suction nozzle being associated with a control element for selectively allowing or interrupting suction feed to the suction nozzle.

The suction nozzle serves to keep the closure element in position while further limiting any risk of the closure element being deformed. This is particularly useful when closure elements accumulate against the closure element that is being held in position.

Other characteristics and advantages of the invention appear on reading the following description of a particular and nonlimiting implementation of the invention.

BRIEF DESCRIPTION OF THE DRAWINGS

Reference is made to the accompanying drawings, in which.

DETAILED DESCRIPTION OF THE INVENTION

Figure 1:
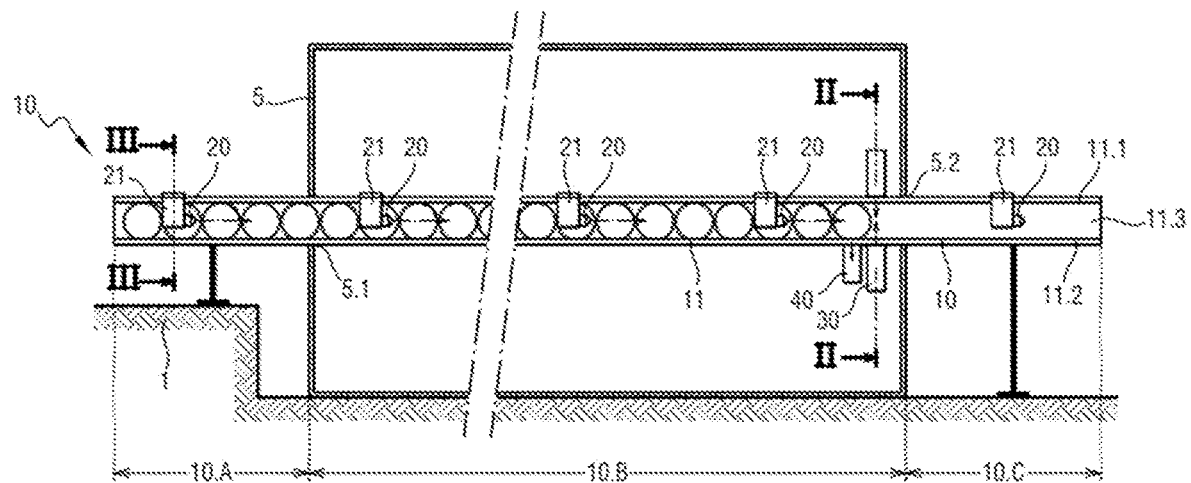
FIG. 1 is a diagrammatic elevation view, partially in section, showing a capsule-treatment installation of the invention.
Figure 2:
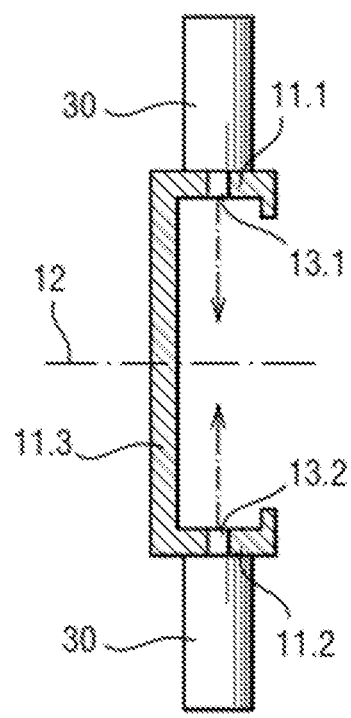
FIG. 2 is a diagrammatic view in cross section on axis II-II of FIG. 1 showing a capsule transport device of the invention.
Figure 3:
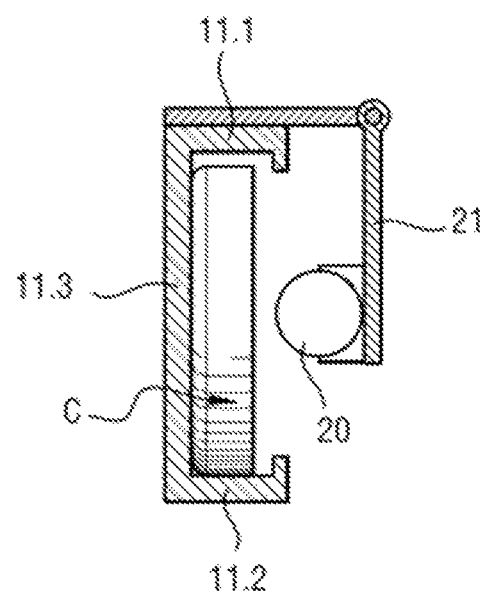
FIG. 3 is a diagrammatic view in cross section on axis III-III of FIG. 1 showing a capsule transport device of the invention.
Figure 4:
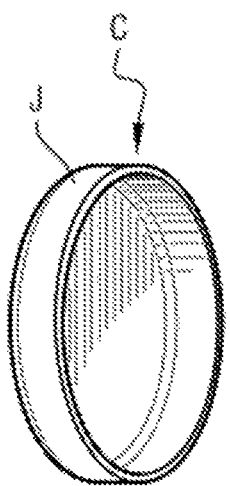
FIG. 4 is a diagrammatic perspective view of a capsule.

The invention relates to transporting capsules or caps, and it is described below with reference to a capsule-treatment installation for incorporating in an installation for filling and closing containers (not shown). In this example, the treatment is decontamination, however the invention is nevertheless applicable to other types of treatment. Each capsule, given reference C, is made out of at least one piece of metal foil having an inside face that is covered in a heat-sealing layer. Each capsule C has an annular peripheral wall in the form of a skirt J projecting from the inside face of the capsule C. Opposite from its inside face, the capsule C has an outside face that may optionally carry marking.

With reference to the figures, in this example, the treatment installation of the invention comprises a support structure given reference 1, having mounted thereon a decontamination enclosure given overall reference 5 and a capsule-transport device given overall reference 10.

By way of example, the decontamination enclosure 5 includes one or more nozzles for spraying a sterilizing chemical solution or indeed one or more emitters for emitting sterilizing radiation. The decontamination enclosure 5 thus defines a treatment zone, and it possesses an inlet 5.1 and an outlet 5.2.

The transport device 10 comprises a slideway 11 having a top longitudinal flange 11.1 and a bottom longitudinal flange 11.2 that are opposite each other and arranged to receive in slidable manner two opposite portions of the skirt J of each capsule C. Between the two flanges 11.1 and 11.2 there extends a web 11.3 having bearing thereagainst the outside faces of the transported capsules C. The slideway 11 is secured to the support structure 1.

The slideway 11 is provided with longitudinal blow nozzles 20 arranged along the slideway 11 to eject a flow of air in a longitudinal direction of the slideway 11 so as to move the capsules C along the slideway 11. The longitudinal blow nozzles 20 serve both to move the capsules C and also to guide them. Each longitudinal blow nozzle 20 is secured to a support 21 that is hinged to the top flange 11.1 of the slideway 11 so as to be movable between an in-use position in which the longitudinal blow nozzle 20 faces the web 11.3 in the vicinity of a middle longitudinal plane 12 of the slideway 11 that extends perpendicularly to the web 11.3 between the two flanges 11.1 and 11.2, and a retracted position in which the longitudinal blow nozzle 20 is moved away from that plane so as to release access to the space extending between the flanges 11.1 and 11.2, e.g. for maintenance or cleaning operations. The longitudinal blow nozzles 20 are associated with a control element, such as a servovalve, for selectively allowing or interrupting the feed of air to the transverse blow nozzles 20.

The device also has two transverse blow nozzles 30, each mounted in a hole 13.1, 13.2 in a respective one of the flanges 11.1 and 11.2 of the slideway 11 in order to eject a flow of air towards the opposite flange 11.2 or 11.1, perpendicularly to the middle longitudinal plane 12. The holes 13.1 and 13.2 face each other. The transverse blow nozzles 30 are associated with a control element, such as a servovalve, for selectively allowing or interrupting the feed of air to the transverse blow nozzles 30.

Finally, the device includes at least one suction nozzle 40 opening out in a hole in the flange 11.2 of the slideway 11, which hole is located upstream from the hole 13.2 relative to the travel direction of the capsules C along the slideway 11. The suction nozzle 40 is positioned to hold a portion of the skirt J of the capsule C that faces it. The suction nozzle 40 is connected to a vacuum duct via a control element, such as a servovalve, for selectively allowing or interrupting suction by the suction nozzle 40.

The slideway 11 has a first segment 11A extending upstream from the treatment zone up to the inlet 5.1, a second segment 11B extending inside the treatment zone from the inlet 5.1 to the outlet 5.2, and a third segment 11C extending downstream from the treatment zone away from the outlet 5.2. The transverse blow nozzles 30 and the suction nozzle 40 are mounted on the second segment 11B, and more particularly in the vicinity of the outlet 5.2 from the decontamination enclosure 5.

The control elements are connected to an electronic control unit designed to operate the control elements in such a manner as to be capable of stopping the flow of capsules C through the decontamination enclosure 5 by:
- feeding the transverse blow nozzles 30 in order to stop a capsule C in the vicinity of the outlet 5.2;
- connecting the suction nozzle 40 to vacuum in order to hold the portion of the skirt J of the capsule C that has been stopped facing the suction nozzle 40, with the flow of capsules C accumulating behind the capsule C having its skirt J being held;
- interrupting feed to the transverse blow nozzles 30 in order to avoid risking damage to the skirt J of the first stopped capsule C;
- returning the suction nozzle 40 to ambient air once the capsules C that have accumulated in the treatment zone (as shown in FIG. 1) have been there for the length of time required for them to be decontaminated, thereby allowing the capsules to move once again under the effect of the longitudinal air flow.

The electronic control unit can also operate the control elements of the longitudinal blow nozzles 20 so as to interrupt their air feed while the flow of capsules C is stopped, and to restore their air feed when the transverse blow nozzles 30 and the suction nozzle are no longer operating. Air feed to the longitudinal blow nozzles may be restored in staggered manner so as to begin by moving the capsules that are in the vicinity of the outlet 5.2 and subsequently move the preceding capsules so as to space the capsules C apart from one another.

When it is necessary only to block one capsule C for a duration that is short enough for there to be no accumulation of capsules C, the electronic control unit operates only the transverse blow nozzles 30, with the suction nozzle 40 remaining inactive.

Figure 5:
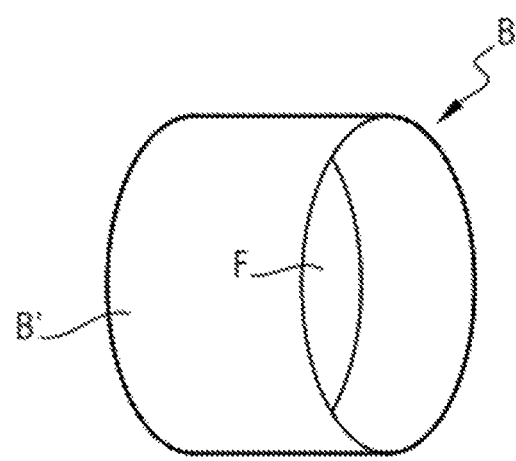
FIG. 5 is a diagrammatic perspective view of a cap.

The invention can naturally be used for transporting caps. As shown in FIG. 5, each cap, given reference B, has an annular edge B', referred to as a rim, that projects from an inside face F of the cap, referred to as its cover. The rim B' of the cap B has a cylindrical outside surface that may be provided with serrations or other geometrical shapes in relief in order to make the cap B easier to grip than if it had a surface that is smooth. The rim B' has an inside surface that may be provided with grooves and threads to enable the cap B to be applied to its packaging and held thereon.

The installation for transporting caps B is substantially identical to the installation described above in association with capsules C.

Naturally, the invention is not limited to the implementation described, but covers any variant coming within the ambit of the invention as defined by the claims.

In particular, the installation may be of a structure different from that described.

The suction nozzle(s) may be located other than on a flange of the slideway. For example, the suction nozzle could thus be positioned so as to open out in a hole in the web of the slideway in order to hold a portion of the outside face of the closure element. The transport device need not have a suction nozzle.

The installation could include some other number of blow and/or suction nozzles. Thus, by way of example, the installation could have a single transverse blow nozzle, in particular when closure elements do not accumulate against the element that has been stopped.

The installation may include movement means other than one or more longitudinal blow nozzles. By way of example, the slideway may be sloping so as to allow capsules or caps to move under gravity.

The longitudinal blow nozzles may be secured to a single support and/or the support for the longitudinal blow nozzles need not be movable.

The suction nozzle 40 may open out in a hole in one of the flanges 11.1 or 11.2 of the slideway 11 in order to hold a portion of the peripheral edge of a facing closure element C or B.

The longitudinal blow nozzle 20 may be secured to a support 21 that is hinged to move between an in-use position in which the longitudinal blow nozzle 20 is located in the vicinity of a longitudinal plane 12 of the slideway 11 extending between its two flanges 11.1 and 11.2, and a retracted position in which the longitudinal blow nozzle 20 is located away from that longitudinal plane 12.

The transport device may be used for purposes other than treating capsules or caps.

The invention claimed is:

1. An installation for treating packaging closure elements each having a peripheral edge, the installation comprising a treatment zone and a transport device for transporting packaging closure elements, the device comprising both a slideway having two opposite longitudinal flanges receiving in slidable manner two opposite portions of the peripheral edge of each closure element, and also movement means for moving the closure elements along the slideway, wherein the device includes at least one transverse blow nozzle mounted in a hole in one of the flanges of the slideway in order to eject a flow of air towards the opposite flange, the transverse nozzle being associated with a control element for selectively allowing or interrupting air feed to the transverse blow nozzle, and in that the slideway has a first segment upstream from the treatment zone, a second segment in the treatment zone, and a third segment downstream from the treatment zone, the transverse blow nozzle being mounted on the second segment.

2. The installation according to claim 1, including two transverse blow nozzles mounted facing each other.

3. The installation according to claim 1, including at least one suction nozzle opening out in the slideway to hold a portion of a facing closure element, the suction nozzle being associated with a control element for selectively allowing or interrupting suction feed to the suction nozzle.

4. The installation according to claim 3, wherein the suction nozzle opens out in a hole in one of the flanges of the slideway in order to hold a portion of the peripheral edge of a facing closure element.

5. The installation according to claim 1, wherein the movement means for moving the closure elements comprise at least one longitudinal blow nozzle arranged along the slideway in order to eject a flow of air along a longitudinal direction of the slideway.

6. The installation according to claim 5, wherein the longitudinal blow nozzle is secured to a support that is hinged to move between an in-use position in which the longitudinal blow nozzle is located in the vicinity of a longitudinal plane of the slideway extending between its two flanges, and a retracted position in which the longitudinal blow nozzle is located away from that longitudinal plane.

7. The installation according to claim 1, wherein the transverse blow nozzle extends in the vicinity of an outlet from the treatment zone.

* * * * *